United States Patent
Lin et al.

(10) Patent No.: US 9,552,024 B2
(45) Date of Patent: Jan. 24, 2017

(54) FIXING BRACKET FOR COMPUTER ACCESSORY AND COMPUTER CASE THEREOF

(71) Applicant: COOLER MASTER TECHNOLOGY INC., New Taipei (TW)

(72) Inventors: Pei-Chiang Lin, New Taipei (TW); Yu-Qing Lyu, New Taipei (TW)

(73) Assignee: COOLER MASTER TECHNOLOGY INC., New Taipei (TW)

( * ) Notice: Subject to any disclaimer, the term of this patent is extended or adjusted under 35 U.S.C. 154(b) by 0 days.

(21) Appl. No.: 14/814,719

(22) Filed: Jul. 31, 2015

(65) Prior Publication Data

US 2016/0349807 A1 Dec. 1, 2016

(30) Foreign Application Priority Data

Jun. 1, 2015 (TW) .............................. 104208632 U

(51) Int. Cl.
*G06F 1/16* (2006.01)
*G06F 1/18* (2006.01)

(52) U.S. Cl.
CPC ..................................... *G06F 1/183* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,828,547 A * | 10/1998 | Francovich | ............. | G06F 1/184 361/679.39 |
| 5,943,208 A * | 8/1999 | Kato | ....................... | G06F 1/184 248/222.11 |
| 6,002,586 A * | 12/1999 | Chen | ........................ | G06F 1/20 174/16.1 |
| 6,102,499 A * | 8/2000 | Chen | ....................... | G06F 1/184 292/106 |
| 6,141,222 A * | 10/2000 | Toor | ....................... | G06F 1/184 312/223.1 |
| 6,227,632 B1 * | 5/2001 | Liu | ......................... | G06F 1/181 312/223.2 |
| 6,236,563 B1 * | 5/2001 | Buican | .................... | G06F 1/184 312/333 |
| 6,252,765 B1 * | 6/2001 | Balzaretti | ............... | G06F 1/184 361/679.42 |

(Continued)

*Primary Examiner* — Lisa Lea Edmonds
(74) *Attorney, Agent, or Firm* — Chun-Ming Shih; HDLS IPR Services

(57) ABSTRACT

A fixing bracket for a computer accessory and a computer case thereof are discloses. The fixing bracket is for the installation of the computer accessory. The interior of the computer case is used for the assembly of the fixing bracket. The fixing bracket includes a carrier, a clamping part, and a limiting part. The carrier plate has a surface for stacking the computer accessory, and a first side edge and a second side edge opposite to one another. The clamping part is disposed on the first side edge. The limiting part is disposed on the second side edge. The computer accessory is stacked on the carrier plate. The clamping part clamps one end portion of the computer accessory and the limiting part tightly presses against the other end portion of the computer accessory such that the computer accessory is attached against to the carrier plate.

15 Claims, 5 Drawing Sheets

(56) References Cited

U.S. PATENT DOCUMENTS

| | | | |
|---|---|---|---|
| 6,252,766 B1* | 6/2001 | Radloff | G06F 1/184 |
| | | | 361/679.41 |
| 6,262,888 B1* | 7/2001 | Siedow | G06F 1/181 |
| | | | 312/249.7 |
| 6,341,072 B1* | 1/2002 | Liao | G06F 1/181 |
| | | | 312/223.2 |
| 6,381,131 B1* | 4/2002 | Liu | G06F 1/181 |
| | | | 360/99.15 |
| 6,582,150 B1* | 6/2003 | Davis | G06F 1/184 |
| | | | 361/725 |
| 7,016,190 B1* | 3/2006 | Chang | G06F 1/184 |
| | | | 235/381 |
| 7,548,416 B2* | 6/2009 | Lin | G06F 1/181 |
| | | | 361/679.02 |
| 8,199,499 B2* | 6/2012 | Chen | G06F 1/188 |
| | | | 312/223.1 |
| 9,135,957 B2* | 9/2015 | Grobe | G11B 33/124 |
| 2004/0047122 A1* | 3/2004 | Chen | G06F 1/184 |
| | | | 361/679.33 |

* cited by examiner

FIXING BRACKET FOR COMPUTER ACCESSORY AND COMPUTER CASE THEREOF

BACKGROUND OF THE INVENTION

Field of the Invention

The present invention relates to a computer and in particular to a fixing bracket for a computer accessory and a computer case thereof.

Description of Related Art

The traditional computer case provided for the installation and assembly of the internal accessories thereof mainly provides a frame of proper size where the internal accessories are fastened by screw holes and screws of default size, such that the necessary accessories can be installed in the computer case. As an example of a general hard disk frame, two sides of a hard disk drive are provided with plural preset screw holes. The hard disk drive is placed on the hard disk frame and then is fastened by some screws to complete the installation.

However, the above design not only causes a screwing step during the installation between the hard disk frame and the computer case but also causes another screwing step during the installation between the hard disk drive and the hard disk frame. That is, multiple screwing steps are required during the whole installation, which is relatively inconvenient. Besides the above-mentioned hard disk drive, the computer accessory installed in the computer case such as a fan or a CD-ROM drive usually requires similar complicated screwing steps, which is also relatively inconvenient.

In view of this, the inventor pays special attention to research with the application of related theory and tries to overcome the above disadvantages regarding the above related art. Finally, the inventor proposes the invention which is a reasonable design and overcomes the above disadvantages.

SUMMARY OF THE INVENTION

It is an objective of the present invention to provide a fixing bracket for a computer accessory and a computer case thereof, which is easy to allow the computer accessory to be install/uninstalled rapidly in/from the fixing bracket by clamping or pressing tightly. In this way, the most screw components and screwing steps can be omitted, which also enables rapid and convenient installation/uninstallation of the fixing bracket in/from the computer case.

In order to achieve the above objective, the present invention provides a fixing bracket for a computer accessory, which is used for the computer accessory to be installed and assembled in a computer case. The fixing bracket comprises a carrier plate, a clamping part, and a limiting part. The carrier plate has a surface for stacking the computer accessory, and a first side edge and a second side edge opposite to one another. The clamping part is disposed on the first side edge. The limiting part is disposed on the second side edge. The computer accessory is stacked on the surface of the carrier plate. The clamping part clamps one end portion of the computer accessory and the limiting part tightly presses against the other end portion of the computer accessory such that the computer accessory is attached against to the carrier plate.

In order to achieve the above objective, the present invention also provides a computer case, which comprises a case body and a fixing bracket used for a computer accessory to be installed and assembled in the case body. The fixing bracket comprises a carrier plate, a clamping part, and a limiting part. The carrier plate has a surface for stacking the computer accessory, and a first side edge and a second side edge opposite to one another. The clamping part is disposed on the first side edge. The limiting part is disposed on the second side edge. The computer accessory is stacked on the surface of the carrier plate. The clamping part clamps one end portion of the computer accessory and the limiting part tightly presses against the other end portion of the computer accessory such that the computer accessory is attached against the carrier plate.

DETAILED DESCRIPTION OF THE INVENTION

To further disclose the characteristics and technical details of the present invention, please refer to the following detailed description and accompanying figures. However, the accompanying figures are only for reference and explanation, but not to limit the scope of the present invention.

Figure 1:
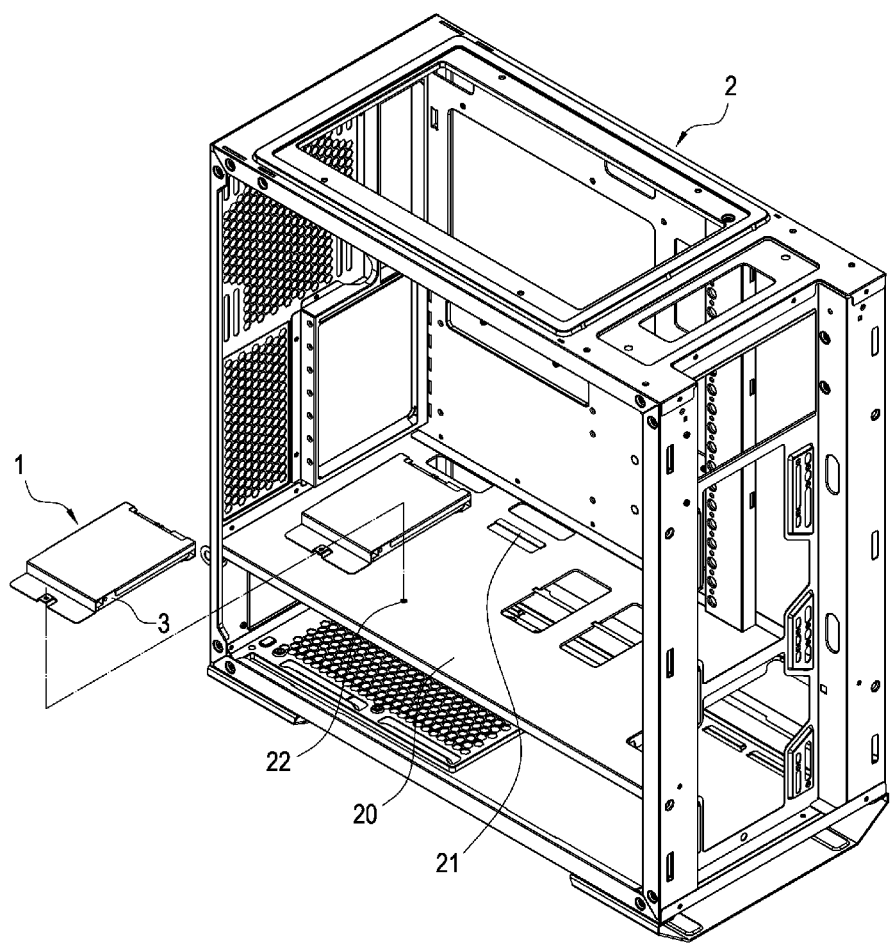
FIG. 1 is a disassembled schematic view of the fixing bracket and the computer case of the present invention.
Figure 2:
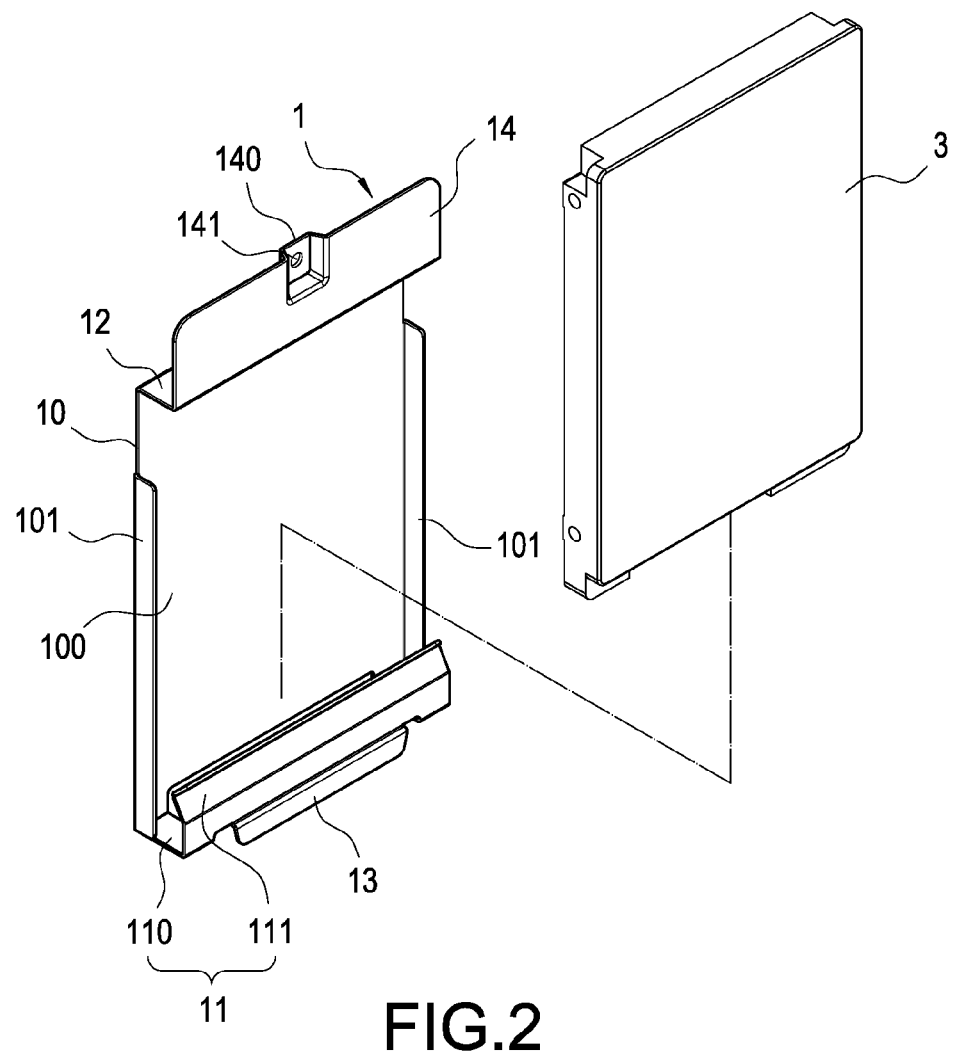
FIG. 2 is a disassembled schematic view of the fixing bracket of the present invention for installation of the computer accessory.

Please refer to FIGS. 1 and 2, which are the disassembled schematic view of the fixing bracket and the computer case of the present invention and the disassembled schematic view of the fixing bracket of the present invention for installation of the computer accessory, respectively. The present invention provides a fixing bracket for a computer accessory and a computer case thereof. The fixing bracket 1 is for a computer accessory 3 to be installed and then the fixing bracket 1 is assembled in a case body 2 of a computer case, which can enable rapid uninstallation and installation. The computer accessory 3 can be a required part installed in a computer such as a hard disk drive, a fan, or a CD-ROM drive. The fixing bracket 1, which can be made of a piece of sheetmetal by pressing and then bending, comprises a carrier plate 10, a clamping part 11, and a limiting part 12.

Figure 3:
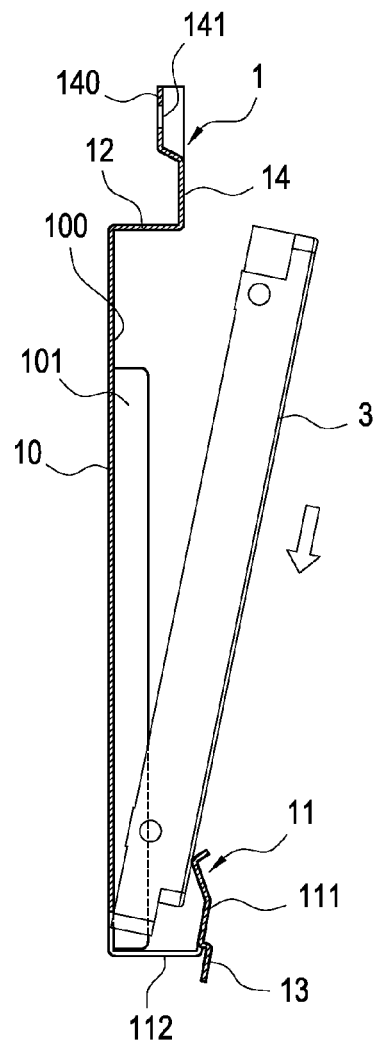
FIG. 3 is an operating schematic view of the fixing bracket of the present invention for installation of the computer accessory.
Figure 4:
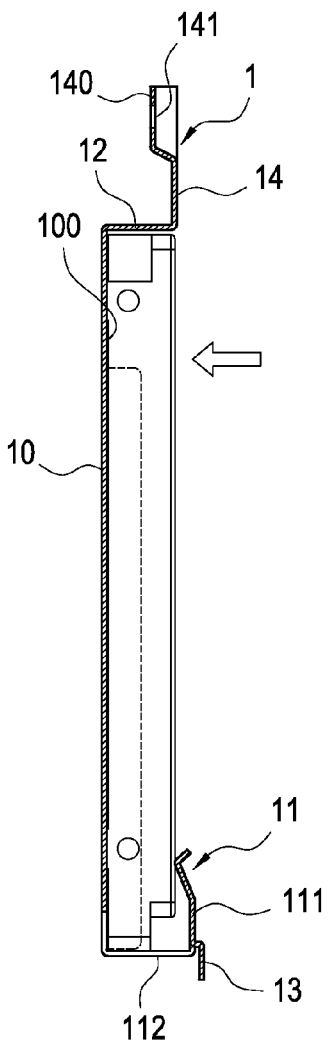
FIG. 4 is another operating schematic view of the fixing bracket of the present invention for installation of the computer accessory.

The carrier plate 10 is used to support the above-mentioned computer accessory 3, so that the computer accessory 3 can be installed in the fixing bracket 1. As shown in FIGS. 2-4, the carrier plate 10 mainly has a surface 100 on which the computer accessory 3 is stacked. In the current embodiment, the computer accessory 3 is a storage device such as a hard disk drive and in particular a solid state drive (SSD). The carrier plate 10 is disposed to fit the size of the hard disk drive. In addition, the carrier plate 10 has a first side edge and a second side edge opposite to one another.

The clamping part 11 is disposed on the first side edge of the carrier plate 10. In the current embodiment of the present invention, the fixing bracket 1 is made of a piece of sheetmetal by pressing and then bending and thus the clamping part 11 may comprise a bottom plate 110 bent from the first side edge of the carrier plate 10 to be substantially vertical to the surface 100 of the carrier plate 10 and a clamping plate 111 bent toward the surface 100 to have a shape of an elastic arm. As shown in FIG. 4, when the above-mentioned computer accessory 3 is stacked on the surface 100 of the carrier plate 10, the clamping part 11 clamps one end portion of the computer accessory 3.

The limiting part 12 is disposed on the second side edge of the carrier plate 10. As described previously, in the current embodiment of the present invention, the fixing bracket 1 is made of a piece of sheetmetal by pressing and then bending and thus the limiting part 12 has a plate-like shape. Also, the limiting part 12 is bent from the second side edge of the carrier plate 10 to be substantially vertical to the surface 100 of the carrier plate 10. As shown in FIG. 4, when the above-mentioned computer accessory 3 is stacked on the surface 100 of the carrier plate 10, the limiting part 12 tightly presses against the other end portion of the computer accessory 3.

Moreover, as shown in FIG. 2, a third and a forth side edges of the carrier plate 10 between the clamping part 11 and the limiting part 12 are individually provided with a stop edge 101. The distance between the two stop edges 101 is disposed to fit a width of the computer accessory 3 such that the computer accessory 3 can be positioned on the carrier plate 10.

Accordingly, as shown in FIGS. 3 and 4, when the above-mentioned computer accessory 3 is to be installed in the fixing bracket 1, one end portion of the computer accessory 3 is inserted into the clamping part 11 first. That is, the one end portion is pressed against between the surface 100 of the carrier plate 10 and the clamping plate 111. Then, the other end portion of the computer accessory 3 is attached against the surface 100 of the carrier plate 10. Meanwhile, the slight deformation of the limiting part 12 can enable the embedment of the other end portion of the computer accessory 3. Thus, the limiting part 12 presses firmly a side surface of the other end portion of the computer accessory 3 and the clamping part 11 also can produce the effect of clamping the one end portion of the computer accessory 3. As a result, the computer accessory 3 is attached against the surface 100 of the carrier plate 10 by both of the clamping part 11 and the limiting part 12. Moreover, in order to reserve the hole location of the plug cable (not shown) to fit the computer accessory 3, the clamping part 11 can be provided with a plug hole 112 through which the computer accessory 3 can provides the connection of the plug cable.

Figure 5:
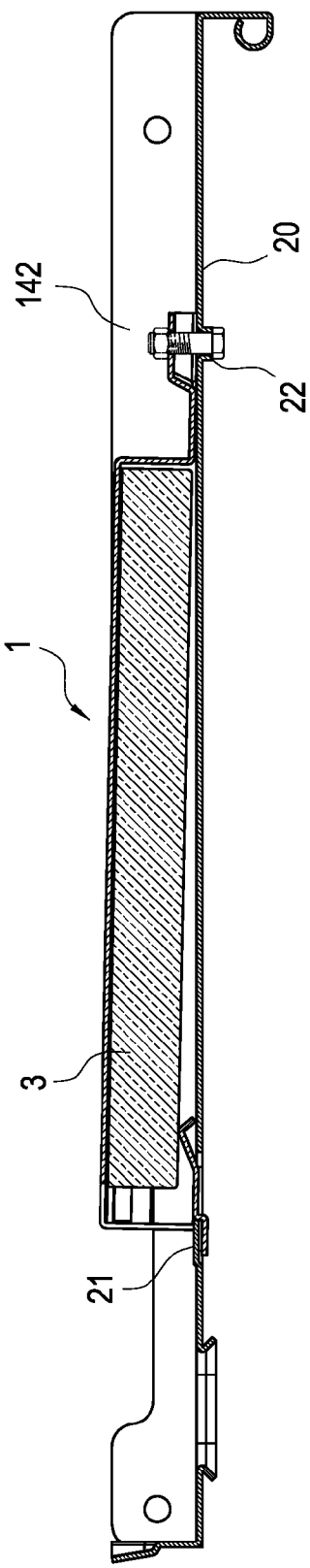
FIG. 5 is a cross-sectional schematic view of the fixing bracket of the present invention for installation and assembly of the computer accessory in the computer case.

Please further refer to FIGS. 1, 2, and 5 together. The fixing bracket 1 is used to be installed and assembled in the case body 2 of the computer case. In the embodiment of the present invention, the fixing bracket 1 can further comprise an embedded part 13 and a fixing part 14. The embedded part 13 can extend outward from the clamping part 11 and, in particular, extend outward opposite to the clamping plat 111. The fixing part 14, which can have a plate-like shape, also can extend outward from the limiting part 12 and, in particular, extend opposite to the embedded part 13. Also, the case body 2 is provided with a suitable location for the assembly of the fixing bracket 1. The suitable location can be any location on the case body 2 or anywhere on the plate body of the computer case, such as an installation plate 20 disposed in the case body 2. The installation plate 20 is provided with at least one insert hole 21 for the embedded part 13 of the fixing bracket 1 to be embedded into the insert hole 21 (as shown in FIG. 5). The fixing part 14 can be attached against the installation plate 20 in various fixing ways such as penetration or snapping such that the fixing part 14 is detachably combined with the case body 2 or the installation plate 20. In the embodiment of the present invention, the fixing part 14 protrudes to form a penetrating portion 140; a throughhole 141 is disposed on the penetrating portion 140; a screw hole 22 is disposed on the installation plate 20 correspondingly; then a fastener 142 such as a bolt is penetrated through the throughhole 141 to be screwed in the crew hole 22. In this way, only a single fastener 142 is required to install/uninstall the computer accessory 3 in/from the fixing bracket 1, which considerably decreases the use of fasteners such as screws and inconvenience.

Figure 6:
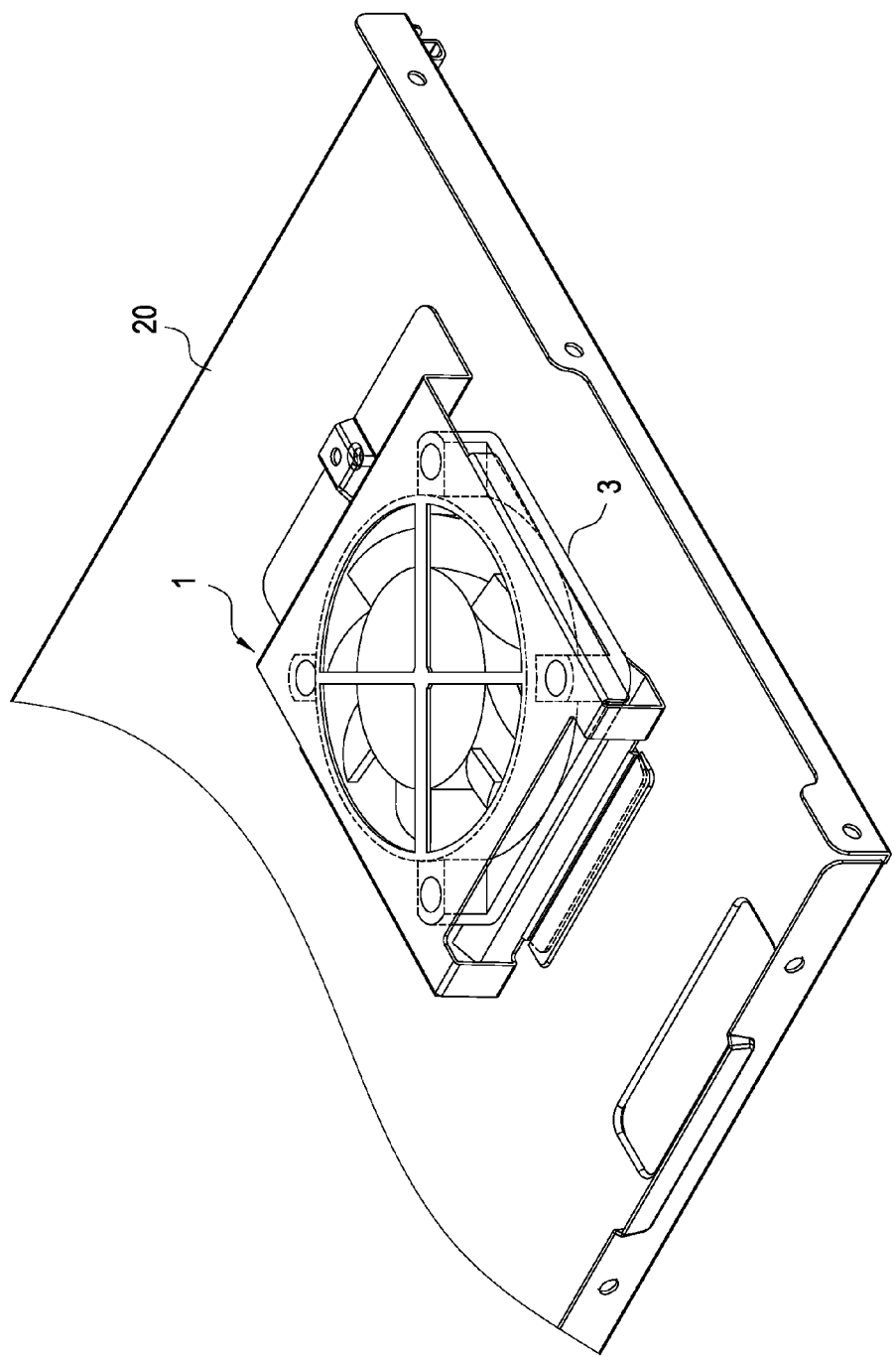
FIG. 6 is a schematic view of the fixing bracket for installation of the computer accessory according to another embodiment of the present invention.

Besides, as shown in FIG. 6, the computer accessory 3 in another embodiment of the present invention can be a fan and a vent 102 corresponding to the fan is disposed on the carrier plate 10 of the fixing bracket 1 such that when the fan is installed on the fixing bracket 1, the fan can operate properly. In addition, if an additional computer accessory 3 such as a CD-ROM drive is required to be installed, a corresponding opening can be provided or reserved based on the installation location, considering the access to the CD-ROM drive in operation.

Accordingly, by the assembly of the above structure, the fixing bracket for a computer accessory and the computer case thereof of the present invention can be obtained.

Thus, by means of the fixing bracket for a computer accessory and the computer case thereof of the present invention, the fixing bracket 1 uses the clamping part 11 and the limiting part 12 to provide types of clamping and pressing tightly to facilitate the installation/uninstallation of the computer accessory 3 in/from the fixing bracket and thus unnecessary screw components and screwing steps can be omitted. Also, when the fixing bracket 1 is assembled to the case body 2 of the computer case, it is assembled to the case body 2 mainly by embedment and can be also screwed firmly only by a single fastener 142. In this way, the most screw components and screwing steps can be omitted and the objective of rapid and convenient installation/uninstallation of the fixing bracket 1 in/from the computer case is achieved.

In summary, the present invention is really an outstanding product, which can achieve the expected objective and overcome the disadvantages of the prior art. Also, the present invention is indeed novel, useful, and non-obvious to be patentable. Please examine the application carefully and grant it as a formal patent for protecting the rights of the inventor.

The embodiments described above are only preferred ones of the present invention and not to limit the claimed scope of the present invention. Therefore, all the equivalent modifications and variations applying the specification and figures of the present invention should be embraced by the claimed scope of the present invention.

What is claimed is:

1. A fixing bracket (1) for a computer accessory (3) to be installed and assembled in a computer case, the fixing bracket (1) comprising:
   a carrier plate (10) having a surface (100) for stacking the computer accessory (3), and a first side edge and a second side edge opposite to one another;
   a clamping part (11) disposed on the first side edge; and
   a limiting part (12) disposed on the second side edge;

wherein the computer accessory (3) is stacked on the surface (100) of the carrier plate (10), the clamping part (11) clamps one end portion of the computer accessory (3) and the limiting part (12) tightly presses against the other end portion of the computer accessory (3) such that the computer accessory (3) is attached against to the carrier plate (10);

wherein the clamping part (11) comprises a bottom plate (110) bent from the first side edge of the carrier plate (10) to be substantially vertical to the surface (100) of the carrier plate (10) and a clamping plate (111) bent toward the surface (100) to have a shape of an elastic arm;

wherein the bottom plate (110) of the clamping part (11) is provided with a plug hole (112).

2. The fixing bracket (1) according to claim 1, wherein the limiting part (12) is bent from the other side of the carrier plate (10) to be substantially vertical to the surface (100) of the carrier plate (10).

3. The fixing bracket (1) according to claim 2, wherein the limiting part (12) has a plate-like shape.

4. The fixing bracket (1) according to claim 1, further comprising an embedded part (13) and a fixing part (14), wherein the embedded part (13) extends outward from the clamping part (11) and the fixing part (14) extends outward from the limiting part (12) such that the embedded part (13) and the fixing part (14) are embedded in and fixed to the computer case, respectively.

5. The fixing bracket (1) according to claim 4, further comprising a fastener (142), wherein the fixing part (14) has a throughhole (141) through which the fastener (142) is screwed to the computer case.

6. The fixing bracket (1) according to claim 5, wherein the fixing part (14) protrudes to form a penetrating portion (140) and the throughhole (141) is disposed on the penetrating portion (140).

7. A fixing bracket (1) for a computer accessory (3) to be installed and assembled in a computer case, the fixing bracket (1) comprising:
a carrier plate (10) having a surface (100) for stacking the computer accessory (3), and a first side edge and a second side edge opposite to one another;
a clamping part (11) disposed on the first side edge; and
a limiting part (12) disposed on the second side edge;
wherein the computer accessory (3) is stacked on the surface (100) of the carrier plate (10), the clamping part (11) clamps one end portion of the computer accessory (3) and the limiting part (12) tightly presses against the other end portion of the computer accessory (3) such that the computer accessory (3) is attached against to the carrier plate (10);
wherein a third side edge and a fourth side edge of the carrier plate (10) between the clamping part (11) and the limiting part (12) are individually provided with a stop edge (101), wherein a distance between the two stop edges (101) is disposed to fit a width of the computer accessory (3).

8. A computer case, comprising:
a case body (2); and
a fixing bracket (1) used for a computer accessory (3) to be installed and assembled in the case body (2), the fixing bracket (1) comprising:
a carrier plate (10) having a surface (100) for stacking the computer accessory (3), and a first side edge and a second side edge opposite to one another;
a clamping part (11) disposed on the first side edge; and
a limiting part (12) disposed on the second side edge;
wherein the computer accessory (3) is stacked on the surface (100) of the carrier plate (10), wherein the clamping part (11) clamps one end portion of the computer accessory (3) and the limiting part (12) tightly presses against the other end portion of the computer accessory (3) such that the computer accessory (3) is attached against to the carrier plate (10);
wherein the fixing bracket (1) further comprises an embedded part (13) and a fixing part (14), wherein the embedded part (13) extends outward from the clamping part (11) and the fixing part (14) extends outward from the limiting part (12) such that the embedded part (13) and the fixing part (14) are embedded in and fixed to the computer case, respectively.

9. The computer case according to claim 8, wherein the clamping part (11) of the fixing bracket (1) comprises a bottom plate (110) bent from the first side edge of the carrier plate (10) to be substantially vertical to the surface (100) of the carrier plate (10) and a clamping plate (111) bent toward the surface (100) to have a shape of an elastic arm.

10. The computer case according to claim 8, wherein the bottom plate (110) of the clamping part (11) of the fixing bracket (1) is provided with a plug hole (112).

11. The computer case according to claim 8, wherein the limiting part (12) of the fixing bracket (1) is bent from the other side of the carrier plate (10) to be substantially vertical to the surface (100) of the carrier plate (10).

12. The computer case according to claim 11, wherein the limiting part (12) of the fixing bracket (1) has a plate-like shape.

13. The computer case according to claim 8, wherein two edges of the carrier plate (10) between the clamping part (11) and the limiting part (12) of the fixing bracket (1) are individually provided with a stop edge (101), wherein a distance between the two stop edges (101) is disposed to fit a width of the computer accessory (3).

14. The computer case according to claim 8, wherein the fixing bracket (1) further comprises a fastener (142), wherein the fixing part (14) has a throughhole (141) through which the fastener (142) is screwed to the computer case.

15. The computer case according to claim 14, wherein the fixing part (14) protrudes to form a penetrating portion (140) and the throughhole (141) is disposed on the penetrating portion (140).

* * * * *